US008848578B2

(12) United States Patent
Mukhopadhyay et al.

(10) Patent No.: US 8,848,578 B2
(45) Date of Patent: Sep. 30, 2014

(54) METHOD AND SYSTEM FOR SUPPORT OF SPANNING TREE PEERING AND TUNNELING IN A FLOOD DOMAIN

(71) Applicants: Maitreya Mukhopadhyay, Allen, TX (US); Wenao Hu, San Jose, CA (US); Hossein Sahabi, Pleasanton, CA (US); Badrinath Natarajan, Dallas, TX (US)

(72) Inventors: Maitreya Mukhopadhyay, Allen, TX (US); Wenao Hu, San Jose, CA (US); Hossein Sahabi, Pleasanton, CA (US); Badrinath Natarajan, Dallas, TX (US)

(73) Assignee: Fujitsu Limited, Kawasaki-shi (JP)

( * ) Notice: Subject to any disclaimer, the term of this patent is extended or adjusted under 35 U.S.C. 154(b) by 80 days.

(21) Appl. No.: 13/656,176

(22) Filed: Oct. 19, 2012

(65) Prior Publication Data

US 2014/0112204 A1    Apr. 24, 2014

(51) Int. Cl.
*H04L 12/44* (2006.01)

(52) U.S. Cl.
USPC ............ 370/256; 370/392; 370/254; 370/397

(58) Field of Classification Search
CPC . H04L 12/4641; H04L 12/4625; H04L 45/14; H04L 45/48
USPC .................................. 370/256, 254, 392, 397
See application file for complete search history.

(56) References Cited

U.S. PATENT DOCUMENTS

| 7,180,899 | B2 * | 2/2007 | De Silva et al. ......... 370/395.31 |
| 7,564,858 | B1 * | 7/2009 | Moncada-Elias et al. .... 370/402 |
| 8,422,500 | B2 * | 4/2013 | Rabie et al. ................... 370/392 |
| 8,549,178 | B2 * | 10/2013 | Sultan et al. .................. 709/249 |
| 8,705,534 | B2 * | 4/2014 | Saltsidis et al. ............... 370/392 |

OTHER PUBLICATIONS

IEEE; "802.1ad—Virtual Bridged Local Area Networks—Amendment 4: Provider Bridges"; Institute of Electrical and Electronics Engineers; pp. 74, May 26, 2006.

* cited by examiner

*Primary Examiner* — Rasheed Gidado
(74) *Attorney, Agent, or Firm* — Baker Botts L.L.P.

(57) ABSTRACT

A network element includes a first customer edge port (CEP) coupled to a customer network, a first and a second flood domain. The first and second flood domain each include one or more provider network ports associated with a provider network. The first CEP is configured to peer spanning tree protocol (STP) data units across a network, and receive and transmit a data unit to a first STP processing instance associated with the first CEP. The first STP processing instance is configured to determine whether the data unit is associated with the first or second flood domain, and forward the data unit to the determined flood domain. The network element includes a second CEP coupled to the customer network and the first flood domain. The second CEP is configured to tunnel STP data units across the provider network, receive and forward a second data unit to the first flood domain.

18 Claims, 8 Drawing Sheets

METHOD AND SYSTEM FOR SUPPORT OF SPANNING TREE PEERING AND TUNNELING IN A FLOOD DOMAIN

TECHNICAL FIELD

The present invention generally relates to networked communications and, more particularly, to a method and system for support of spanning tree peering and tunneling in a flood domain.

BACKGROUND

Communication networks between remote points may be used to convey rapidly large amounts of information. A communication network may include network elements that route packets and data through the network. Some network elements may include a distributed architecture, wherein packet processing may be distributed among several subsystems of the network element (e.g., line cards).

To ensure loop-free topology in communications networks, spanning tree protocol (STP) may be employed by a network. A basic function of STP is to prevent loops and ensuing broadcast radiation that occurs in the presence of loops. To prevent loops, STP may determine if multiple paths exist between two network elements and break or disable one of the paths if a loop would otherwise exist.

SUMMARY

In particular embodiments, a network element includes a first customer edge port (CEP) that is communicatively coupled to a customer network, a first flood domain, and a second flood domain. The first flood domain and second flood domain each include one or more provider network ports associated with a provider network. The first CEP is configured to peer spanning tree protocol (STP) data units across the provider network, receive a first data unit, and transmit the first data unit to a first STP processing instance associated with the first CEP. The first STP processing instance is configured to determine whether the first data unit is associated with the first flood domain or the second flood domain, and forward the first data unit to the determined flood domain. Additionally, the network element includes a second CEP communicatively coupled to the customer network and the first flood domain. The second CEP is configured to tunnel STP data units across the provider network, receive a second data unit, and forward the second data unit to the first flood domain.

In another embodiment, a method for support of spanning tree peering and tunneling with a plurality of flood domains includes configuring a first customer edge port (CEP) to peer spanning tree protocol (STP) data units across a provider network. The first CEP is communicatively coupled to a customer network, a first flood domain, and a second flood domain. Further, the first flood domain and second flood domain each include one or more provider network ports associated with the provider network. The method also includes receiving a first data unit at the first CEP and transmitting the first data unit to a first STP processing instance associated with the first CEP. The method includes determining whether the first data unit is associated with the first flood domain or the second flood domain, and forwarding the first data unit to the determined flood domain. Additionally, the method includes configuring a second CEP to tunnel STP data units across the provider network. The second CEP is communicatively coupled to the customer network and the first flood domain. The method includes receiving a second data unit at the second CEP, and forwarding the second data unit to the first flood domain.

The object and advantages of the invention will be realized and attained by means of at least the features, elements, and combinations particularly pointed out in the claims. It is to be understood that both the foregoing general description and the following detailed description are exemplary and explanatory and are not restrictive of the invention, as claimed.

DETAILED DESCRIPTION

Embodiments of the present invention and its advantages are best understood by referring to FIGS. 1-9 of the drawings, like numerals being used for like and corresponding parts of the various drawings.

Figure 1:
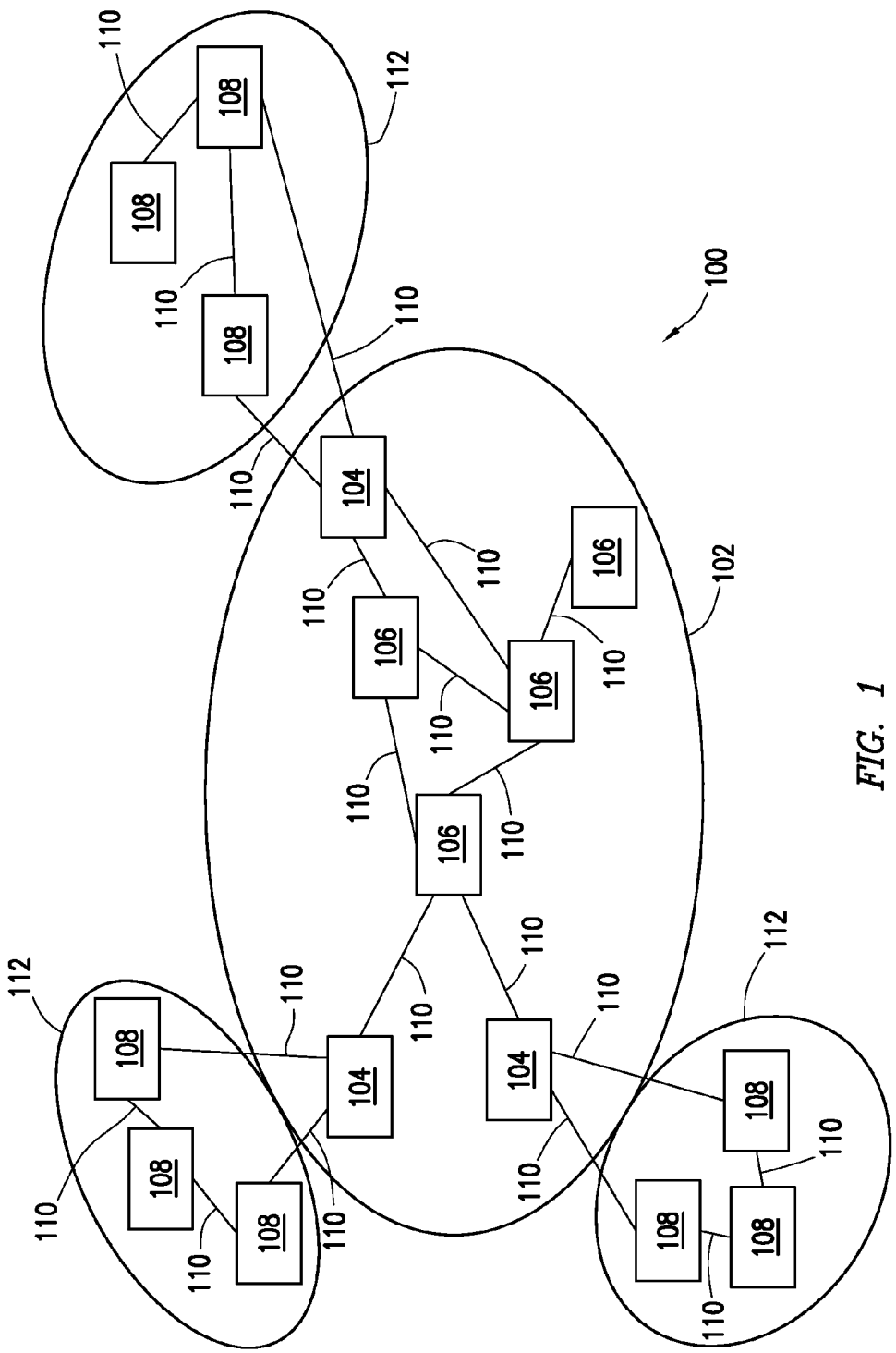
FIG. 1 illustrates a block diagram of an example network, in accordance with one embodiment of the present disclosure.

FIG. 1 illustrates a block diagram of an example network 100, in accordance with one embodiment of the present disclosure. Network 100 may be a local area network (LAN), extended LAN, wide area network (WAN), short-haul metropolitan network, a long-haul inter-city network, or any other suitable network or combination of networks. In one embodiment, network 100 may be an Ethernet network. Network 100 may include one or more transmission media 110 operable to transport one or more signals communicated by components of network 100. The components of network 100, coupled together by transmission media 110, may include a plurality of network elements 104, 106, and 108. In the illustrated network 100, network elements 104, 106, and 108 may be coupled using a Spanning Tree Protocol (for example, as standardized in IEEE 802.1Q-2011). Spanning Tree Protocol is a link management protocol that may provide path redundancy while preventing undesirable bridging loops in the network. Only one active path may exist between any two network elements. If multiple active paths exist, the traffic between the two network elements may loop in the network. Spanning Tree Protocol may define a tree that spans all devices in a Layer-2 network and may configure all redundant data paths into a standby or blocked state. In operation, network elements 104, 106, and 108 may be unaware the network topology of the spanning tree connections.

Each transmission medium 110 may include any system, device, or apparatus configured to communicatively couple network elements 104, 106, 108 to each other and communicate information between corresponding network elements 104, 106, 108. For example, a transmission medium 110 may include an optical fiber, an Ethernet cable, a T1 cable, copper cable, SONET cable, a WiFi signal, a Bluetooth signal, or other suitable medium.

Network 100 may communicate information or "traffic" over transmission media 110. As used herein, "traffic" means information transmitted, stored, or sorted in network 100. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard, Internet Protocol (IP), Internet Group Management Protocol (IGMP), Spanning Tree Protocol (STP) and/or others. Further, traffic may be unicast, e.g., sent from a single device to a single device, and/or multicast, e.g., sent from a single device to communicate with a specific set of devices. Additionally, the traffic communicated in network 100 may be structured in any appropriate manner including, but not limited to, being structured in frames, packets, or an unstructured bit stream. For example, STP messages may be structured as bridge protocol data units (BPDUs). In one embodiment, BPDUs may be special data frames used by bridges to exchange information about bridge identification and root path costs. BPDUs may contain source addresses and destination addresses. As used herein, the term "data unit" may be used to refer generally to any data structure used to convey traffic, including without limitation a packet, a frame, an unstructured bit stream, a BPDU, a customer BPDU (C-BPDU), and/or any other suitable data structure.

Each network element 104, 106, 108 in network 100 may comprise any suitable system operable to transmit and receive traffic. In the illustrated embodiment, each network element 104, 106, 108 may be operable to transmit traffic directly to one or more other network elements 104, 106, 108 and receive traffic directly from the one or more other network elements 104, 106, 108. Further, network elements 104, 106, 108 may be referred to as "nodes" or "bridges." Network elements 104, 106, 108 may also be configured into one or more virtual LANs (VLANs). A VLAN may be a network that may be logically segmented according to one or more factors without regard to a physical location of network elements. For example, network elements 104, 106, 108 may be grouped based on company departments, such as accounting or marketing, instead of their physical locations. As another example, a VLAN may be segmented between networks that transmit data, video, audio, and/or any other suitable segmentation. A customer VLAN (C-VLAN) may be under the administrative control of a single customer of a service provider. Additionally, a service VLAN (S-VLAN) may be a VLAN used by a service provider to support different customers. A S-VLAN may be associated with a flood domain.

Network elements may be designated as provider edge bridges 104, provider bridges 106, and/or customer bridges 108. Provider edge bridges (PEB) 104 and provider bridges 106 may be structured in provider network 102. PEBs 104 may be provider bridges at the edge of provider network 102. Provider network 102 may be any structure that may connect multiple customer networks 112. For example, provider network 102 may be a provider network, a WAN, the Internet, and/or any other suitable network or combination of networks.

Figure 2:
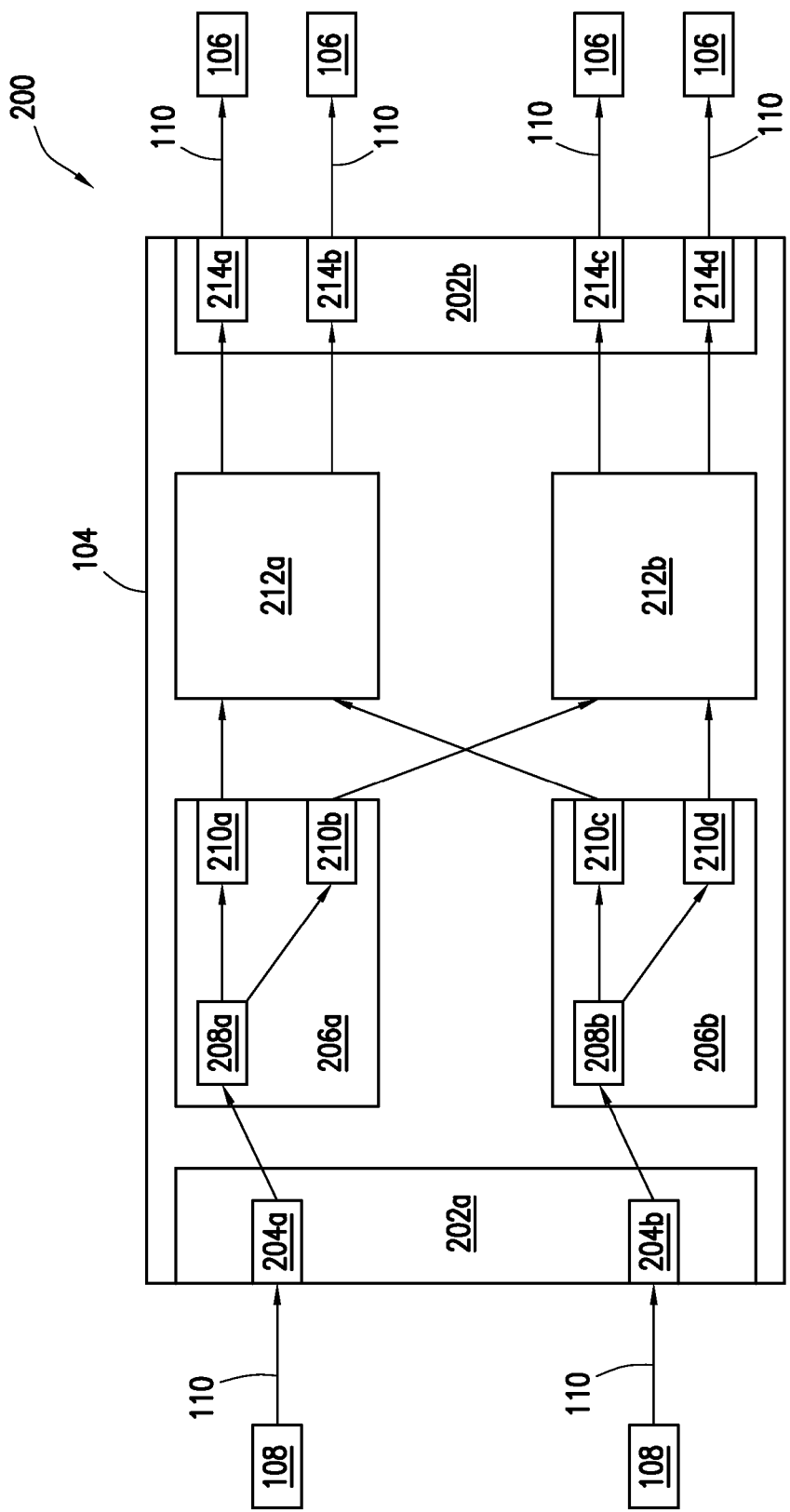
FIG. 2 illustrates a block diagram of an example provider edge bridge (PEB) peering data units, in accordance with one embodiment of the present disclosure.
Figure 3:
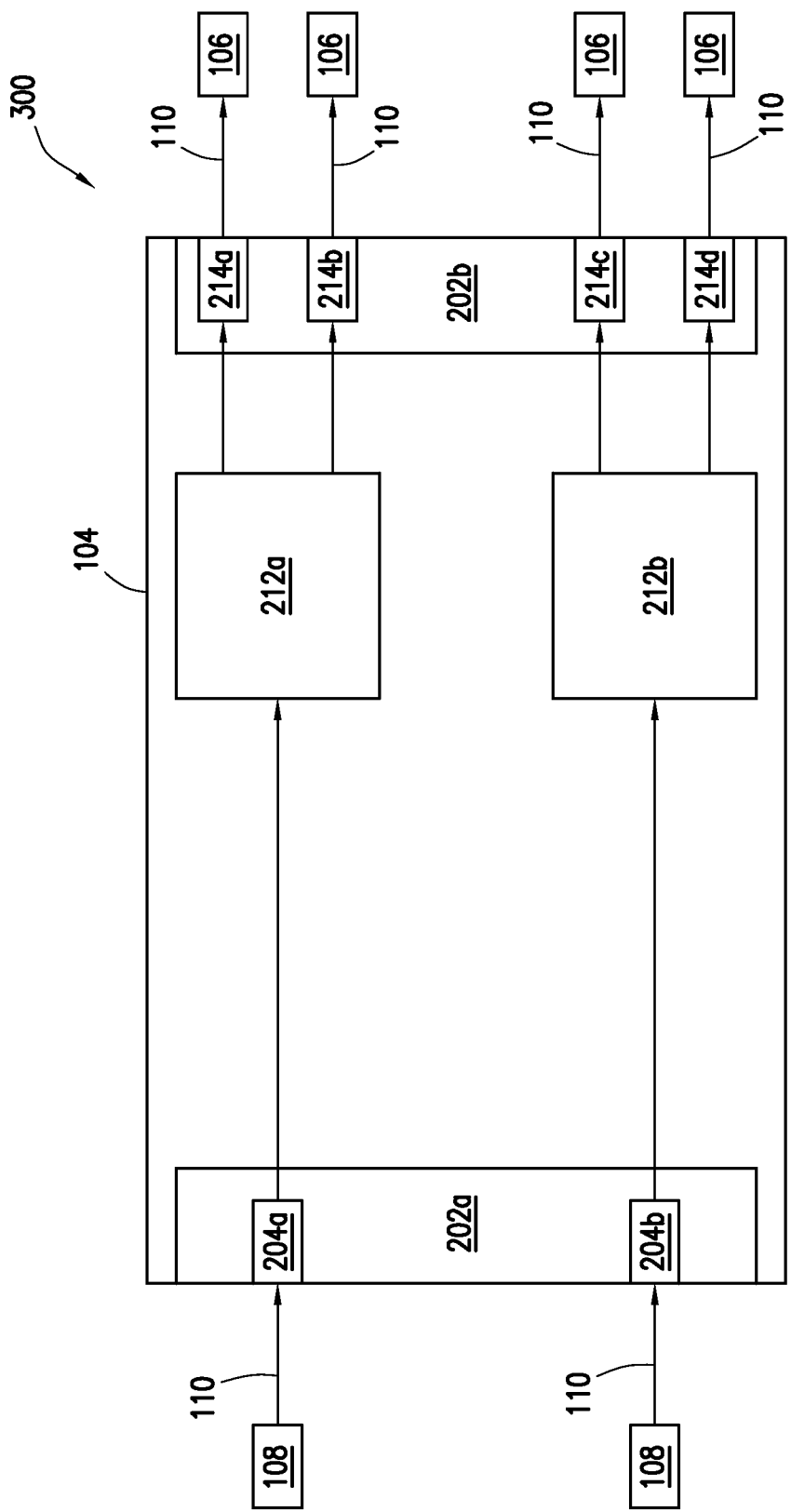
FIG. 3 illustrates a block diagram of an example PEB tunneling data units, in accordance with one embodiment of the present disclosure.
Figure 4:
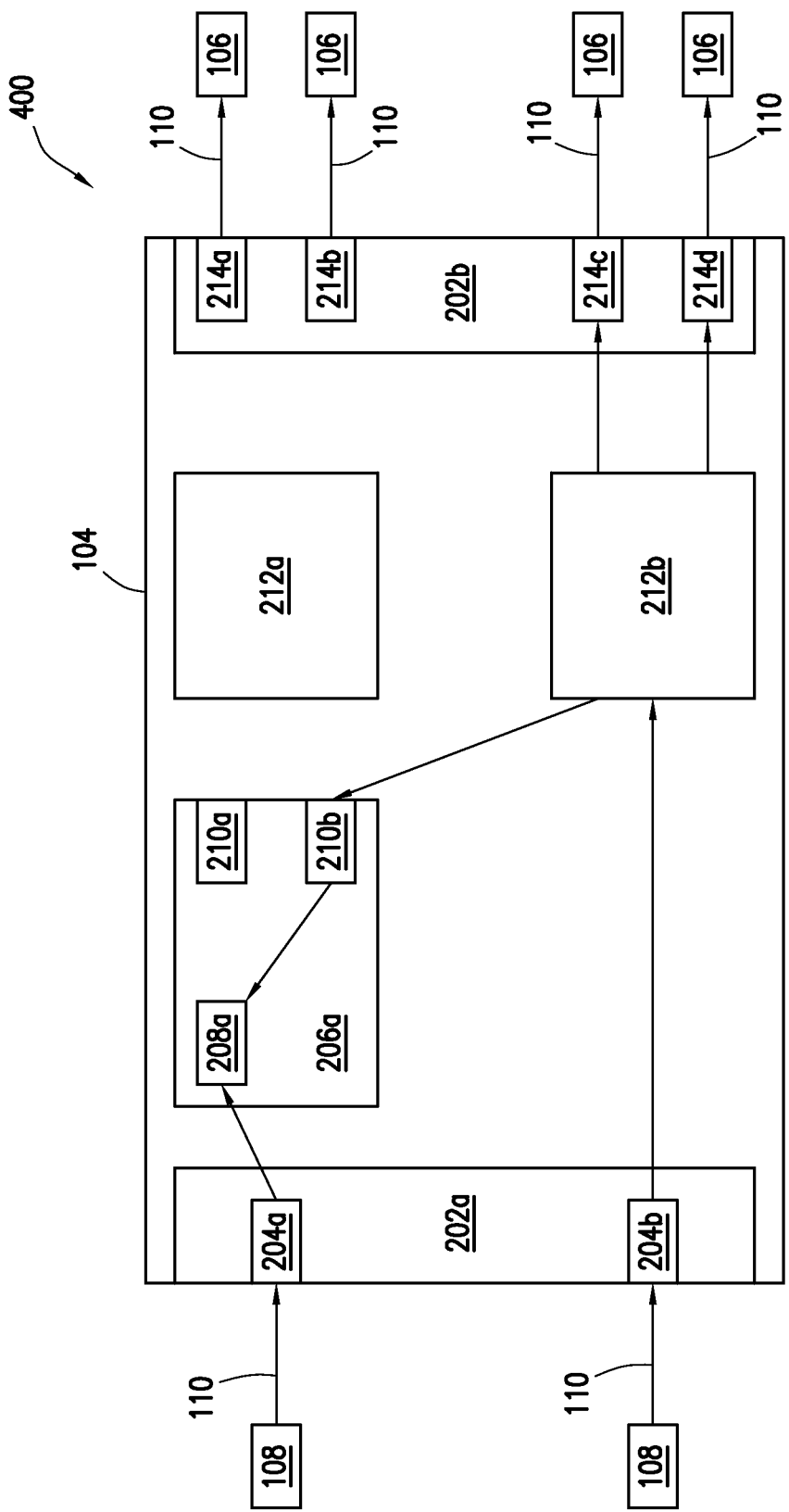
FIG. 4 illustrates a block diagram of an example PEB configured for simultaneous tunneling and peering for the same flood domains of data units received at a customer bridge, in accordance with one embodiment of the present disclosure.

Customer bridges 108 may be further designated as customer edge bridges, VLAN bridges, and/or C-VLAN bridges. In the illustrated embodiment, customer bridges 108 may be arranged in one or more customer networks 112. Customer network 112 may be at a same or different customer location as other customer networks 112. Customer bridges 108 may connect customer network 112 to provider network 102 through PEB 104. Customer bridges 108 that may communicate with PEB 104 may be termed a "customer edge bridge." Further, customer bridges 108 may communicate with other customer bridges 108 (including customer bridges 108 in different customer networks 112) utilizing any suitable protocol. For example, customer bridges 108 may execute a customer STP. In some embodiments and as described in further detail with respect to FIGS. 2-4, provider bridges 106 and/or PEB 104 may also peer and/or tunnel STP control messages between customer networks 112. Peering and/or tunneling STP may provide end-to-end loop free topology to customer networks 112. Thus, provider network 102 may provide for transmission of data between and among customer networks 112.

In certain embodiments of the present disclosure, customers may send data units, or C-BPDUs, from one customer network 112 to another customer network 112 across provider network 102. This transmission may be facilitated by PEBs 104. PEBs 104 may be configured to tunnel traffic and/or to peer traffic from one customer network 112 to another. Tunneling allows transmission of the data unit by the PEB 104 without participating in customer STP. Thus, tunneling may be accomplished without consuming any STP processing resources. Tunneling may occur if PEB 104 receives traffic that will be forwarded to only a single flood domain or S-VLAN. For example, PEB 104 may receive a data unit, such as a C-BPDU, from customer bridge 108 that may be configured to be forwarded to a single flood domain, such as a first S-VLAN. With peering, the PEB 104 participates in the customer STP and processes data units to determine the flood domains to which the data units should be forwarded. In peering, PEB 104 may receive data units for processing and/or may generate data units that require processing. Thus, peering may consume processing resources in customer network 112 and/or provider network 102. Peering may occur if PEB 104 receives traffic that may be forwarded to multiple flood domains or S-VLANs. For example, PEB 104 may receive a data unit, such as a C-BPDU, from customer bridge 108 that may be configured to be forwarded to multiple flood domains, such as a first S-VLAN and a second S-VLAN.

Accordingly, FIG. 2 illustrates a block diagram 200 of an example PEB 104 peering data units (such as C-BPDUs and/or other STP control information), in accordance with one embodiment of the present disclosure. As discussed with reference to FIG. 1, PEB 104 may receive traffic from customer bridges 108 via transmission medium 110. Traffic may be received and tagged for transmission to a particular flood domain 212a or 212b (collectively referred to as flood domains 212) or for transmission to multiple flood domains, such as flood domains 212a and 212b.

Traffic may be received across transmission medium 110 by network interface 202a or 202b (collectively referred to as network interface 202). Each network interface 202 may be communicatively coupled to a switching module 206a or 206b (collectively referred to as switching modules 206). Switching modules 206 may include any suitable system, apparatus, or device configured to serve as an interface between PEB 104 and a transmission medium 110. Each network interface 202 may enable PEB 104 to communicate to other network elements 106 and/or 108 using any suitable transmission protocol and/or standard. Network interface 202 and its various components may be implemented using hardware, software, or any combination thereof. For example, in certain embodiments, one or more network interfaces 202 may include a network interface card. In the same or alternative embodiments, one or more network interfaces 202 may include a line card.

Each of network interfaces 202 may include one or more physical ports 204a, 204b, 214a, 214b, 214c, and 214d (collectively referred to as physical ports 204 and 214, respectively). Each physical port 204 and 214 may include any system, device or apparatus configured to serve as a physical interface between a corresponding transmission medium 110 and network interface 202. For example, physical ports 204 and 214 may comprise an Ethernet port, an optical port, or any other suitable port.

Physical ports 204a and 204b may be communicatively coupled to receive traffic from and/or transmit traffic to customer bridges 108. Ports 204a and 204b may be termed "customer edge ports" (CEPs) 204. CEP 204a may be communicatively coupled to switching module 206a. Further, ports 214a, 214b, 214c and 214d may be communicatively coupled to transmit traffic to and/or receive traffic from provider bridges 106. Ports 214a, 214b, 214c and 214d may be collectively termed "provider network ports" (PNPs) 214. PNPs 214 may be communicatively coupled to flood domains 212a and 212b (collectively referred to as flood domains 212). For example, PNPs 214a and 214b may be communicatively coupled to flood domain 212a. PNPs 214c and 214d may be communicatively coupled to flood domain 212b.

In operation, network interface 202 may be configured to receive traffic via CEPs 204 and forward such traffic to switching module 206 and/or flood domains 212. Switching module 206 may forward such traffic to flood domains 212 and/or another network interfaces 202 and/or PNPs 214 based on an analysis of contents of data units carrying the traffic and/or based on a characteristic of a signal carrying the data units (e.g., a wavelength or modulation of the signal). For example, in some embodiments, network interface 202 may include a network processing unit capable of performing network traffic processing and forwarding. Network interface 202 may include a processor configured to interpret and/or execute program instructions and/or process data (e.g., microprocessor, microcontroller, digital signal processor (DSP), application specific integrated circuit (ASIC), or any other digital or analog circuitry configured to interpret and/or execute program instructions and/or process data). In embodiments of the present disclosure, network interface 202 may perform functionality associated with determining if traffic is tagged by a customer VLAN tag (c-tag) and/or a service VLAN tag (s-tag). A c-tag may be associated with a data unit by customer bridge 108, while a s-tag may be associated with a data unit by provider bridge 106. The presence of a c-tag or s-tag may indicate whether the traffic may be transmitted to a single or multiple flood domains 212 (e.g., tunneled or peered).

Switching module 206 may include any suitable system, apparatus, or device configured to transmit traffic between particular CEPs 204 and particular flood domains 212, network interfaces 202, and/or PNPs 214. Switching module 206 may include a processor configured to interpret and/or execute program instructions and/or process data (e.g., microprocessor, microcontroller, digital signal processor (DSP), application specific integrated circuit (ASIC), or any other digital or analog circuitry configured to interpret and/or execute program instructions and/or process data). Switching module 206 may transmit and/or receive traffic via ports 210a, 210b, 210c, and 210d that may be termed "provider edge ports" (PEPs). PEPs 210a, 210b, 210c, and 210d may be collectively referred to as PEPs 210.

Switching module 206 may be communicatively coupled to receive and/or transmit traffic to flood domains 212 based on analyzing the contents of the data units, the traffic, a c-tag, and/or based on a characteristic of a signal carrying the data units (e.g., a wavelength and/or modulation of the signal). Further, switching modules 206 may include one or multiple PEPs 210. For example, switching module 206a may include PEPs 210a and 210b. As another example, switching module 206b may include PEPs 210c and 210d.

In certain embodiments, switching module 206 may include processing instances 208a and 208b (collectively referred to as processing instances 208). Processing instances 208 may be spanning tree protocol (xSTP) instances in embodiments of the present disclosure. Processing instance 208 may be configured to receive data units from CEPs 204 and direct data units via PEPs 210 to appropriate flood domains 212. For example, Processing instance 208a may process all traffic and/or data units (e.g., C-BPDUs) transmitted across CEP 204a from customer bridge 108. As another example, processing instance 208b may process all data units transmitted on CEP 204b. In another embodiment, processing instance 208 may be configured to receive data units via PEPs 210 from flood domain 212.

In embodiments of the present disclosure, peering of a data unit may occur within PEB 104. In a peering operation, data units transmitted via CEP 204a from customer bridge 108 may be analyzed by network interface 202a. Network interface 202a may determine the data unit is tagged to be distributed to multiple flood domains 212a and 212b. Network interface 202a may forward the traffic to switching module 206a where processing instance 208a may determine the mapping of the data unit. As an example, switching module 206a may transmit the data unit directed to flood domain 212a via PEP 210a. Switching module 206a may likewise transmit the data unit directed to flood domain 212b via PEP 210b. As another example, switching module 206b may transmit a data unit from CEP 204b mapped to flood domain 212a via PEP 210c, and may transmit a data unit mapped to flood domain 212b via PEP 210d. Once a data unit is received by flood domains 212, it may be transmitted to PNPs 214 for further transmission via transmission medium 110 to provider bridges 106.

For peering, network element 104 may be configured to include one CEP 204 and multiple PEPs 210 that may map to multiple flood domains 212. Additionally, network element 104 configured for peering may dictate that a data unit be processed by processing instance 208. Depending on implementation and/or design requirements, each processing instance 208 may necessitate use of a state machine. Many individual state machines may lead to excessive and/or unnecessary processing instances 208 leading to potential performance impact for customer network 112 and/or provider network 102.

FIG. 3 illustrates a block diagram 300 of an example PEB 104 tunneling data units, in accordance with one embodiment of the present disclosure. As discussed with reference to FIGS. 1 and 2, PEB 104 may receive data units from customer bridges 108. Data units may be received and tagged for transmission to a particular flood domain 212a or 212b or for transmission to multiple flood domains 212a and 212b.

Data units may be received across transmission medium 110 by network interfaces 202. Each network interface 202 may enable PEB 104 to communicate to other network elements 106 and/or 108 using any suitable transmission protocol and/or standard. Network interface 202 and its various components may be implemented using hardware, software, or any combination thereof. For example, in certain embodiments, one or more network interfaces 202 may include a network interface card. In the same or alternative embodiments, one or more network interfaces 202 may include a line card.

Each of network interfaces 202 may include one or more CEPs 204 and PNPs 214. CEPs 204 may be communicatively coupled to receive data units from and/or transmit data units to customer bridges 108. In tunneling, CEPs 204 may further be communicatively coupled to flood domains 212. For example, CEP 204a may be communicatively coupled to flood domain 212a. As another example, CEP 204b may be communicatively coupled to flood domain 212b.

Further, PNPs 214a, 214b, 214c and 214d may be communicatively coupled to transmit traffic to and/or receive traffic from provider bridges 106. PNPs 214 may also be communicatively coupled to flood domains 212. For example, PNPs 214a and 214b may be communicatively coupled to flood domain 212a. As another example, PNPs 214c and 214d may be communicatively coupled to flood domain 212b.

In some embodiments of the present disclosure, a data unit may be mapped to only one flood domain 212, e.g., mapped for tunneling. Accordingly, network interface 202 may be configured to receive data units via CEPs 204 and forward such data units to flood domains 212. Network interface 202 may forward such data units to flood domains 212 and/or another network interfaces 202 and/or PNPs 214 based on an analysis of contents of the data units and/or based on a characteristic of a signal carrying the data units (e.g., a wavelength or modulation of the signal). For example, as discussed in reference to FIG. 2, network interface 202 may include a network processing unit capable of performing network traffic processing and forwarding. In operation, data units (e.g., C-BPDUs) transmitted across CEP 204a from customer bridges 108 may be analyzed by network interface 202a. Network interface 202a may determine the traffic is untagged multicast data to be distributed to a single flood domain 212a or 212b. Network interface 202a may forward the traffic to the particular flood domain 212a or 212b. As an example, network interface 202a may map data units to flood domain 212a from CEP 204a. As another example, network interface 202a may map data units to flood domain 212b from CEP 204b. Once traffic is received by flood domain 212, it may be transmitted to PNPs 214 for further transmission via transmission medium 110 to provider bridges 106. Tunneling of data units may not entail a processing instance (e.g., xSTP instance) and thus, may utilize less resources than peering.

As depicted in FIG. 3, tunneling data may occur when each CEP 204 maps to only one flood domain 212. Accordingly, switching module 206 shown in FIG. 2 may not participate in tunneling. Forwarding of data units may be in hardware similar to a multicast untagged data frame with no software impact. However, tunneling only may be restrictive in that user traffic coming to a customer port may not be able to take advantage of mapping to multiple flood domains 212.

FIG. 4 illustrates block diagram 400 of an example PEB 104 configured for simultaneous tunneling and peering for the same flood domains 212 of data units received from customer bridge 108, in accordance with one embodiment of the present disclosure. PEB 104 may allow for dynamic switching between data units configured for peering and data units configured for tunneling. In operation, particular CEPs 204 may be peering while other CEPs 204 may be tunneling. CEPs 204 configured for peering and/or tunneling may be in the same location or may be in different locations. For example, if the data unit arriving at CEP 204b maps to a single flood domain 212b, the data unit may be tunneled. Tunneling may be accomplished through hardware that treats the data unit as untagged multicast data traffic without incurring any processing overhead for the processing engine of PEB 104. As another example, a data unit arriving at CEP 204a may map to multiple flood domains 212a and 212b. The data unit may indicate mapping to multiple flood domains 212 based on traffic type or identified by an incoming c-tag. CEP 204a and network interface 202 may switch to peering mode and may start peering the data unit associated with CEP 204a and customer bridge 108.

For example, the data units entering CEP 204 may be untagged multicast frames, and CEP 204 may be configured for tunneling. These untagged multicast frames may be flooded by hardware in flood domain 212 similar to any other incoming untagged multicast data frame. As such, no switching module 206 may be utilized to tunnel these data units, and thus, no processing resources may be expended. As another example, CEP 204 may be configured for peering. A received data unit at CEP 204 configured for peering may be forwarded to switching module 206 that may include processing instance 208a. The data unit in this instance may be processed by processing instance 208a. As a result of this processing, the data unit may then be mapped to multiple flood domains 212.

In certain embodiments of the present disclosure, CEPs 204 may be peering based on data units including a c-tag. For example, CEP 204a may be peering based on receipt of a data unit including a c-tag. CEP 204a may forward the data unit to processing instance 208a for processing. Processing instance 208a may further map such a data unit to flood domains 212a and 212b.

As another example depicted in FIG. 4, a data unit received at CEP 204b may not include a c-tag. In this case, such a data unit may be forwarded directly to flood domain 212b. This data unit transmitted across CEP 204b may be flooded by hardware without any local processing to all ports that are communicatively coupled to flood domain 212b. Because flood domain 212b may be communicatively coupled to CEP 204a via PEP 210b, a data unit arriving on CEP 204b may be forwarded to processing instance 208a for processing.

Figure 5:
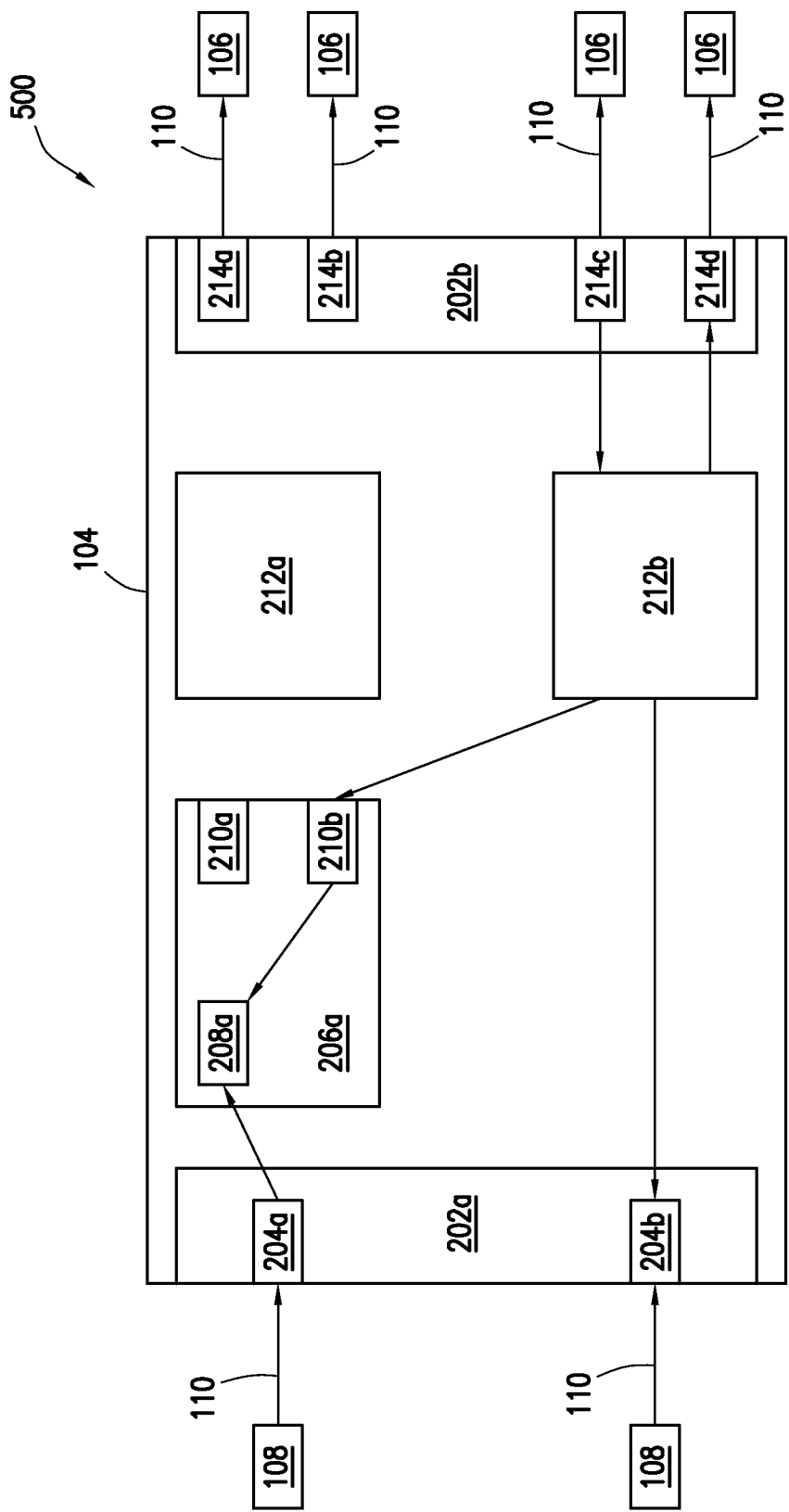
FIG. 5 illustrates a block diagram of an example PEB configured for simultaneous tunneling and peering for the same flood domains of data units received from a provider bridge, in accordance with one embodiment of the present disclosure.

FIG. 5 illustrates a block diagram 500 of an example PEB 104 configured for simultaneous tunneling and peering for the same flood domains 212 of data units received from provider bridge 106, in accordance with one embodiment of the present disclosure. A data unit may arrive for transmission at one of PNPs 214. For example, a data unit may arrive at PNP 214c. The data unit arriving at a particular PNP 214 may include a s-tag identifying a corresponding flood domain 212. For example, a data unit may arrive at PNP 214c with an s-tag identifying flood domain 212b. In this case, if flood domain 212b is communicative coupled to CEPs 204 that may be tunneling, the subject data unit may be flooded to those CEPs 204 as multicast data. For example, a data unit received at PNP 214c may be mapped to flood domain 212b. Flood domain 212b may be communicatively coupled to CEP 204b configured for tunneling. The data unit may be transmitted to CEP 204b as multicast data by hardware and may not entail processing by switching module 206a and/or processing instance 208a. Thus, such a transmission may not incur any processing overhead.

However, if flood domain 212 is communicatively coupled to at least one CEP 204 that may be configured for peering, then the subject data unit may be forwarded to switching module 206 and/or processing instance 208 for processing. For example, a data unit may arrive at PNP 214c. The data unit may be inspected to determine if it has a s-tag for mapping to a particular flood domain 212. For example, the data unit may have a s-tag for mapping to flood domain 212b. Further, flood domain 212b may be communicatively coupled to at least one CEP 204, such as CEP 204a, configured for peering. The data unit may be forwarded to switching module 206a for local processing by processing instance 208a. Processing instance 208a may additionally have a state machine for each peering CEP 204. Furthermore, a data unit arriving at PNP 214c may also be flooded by hardware without any local processing to all other PNPs 214 connected to flood domain 212b, such as PNP 214d.

Figure 6:
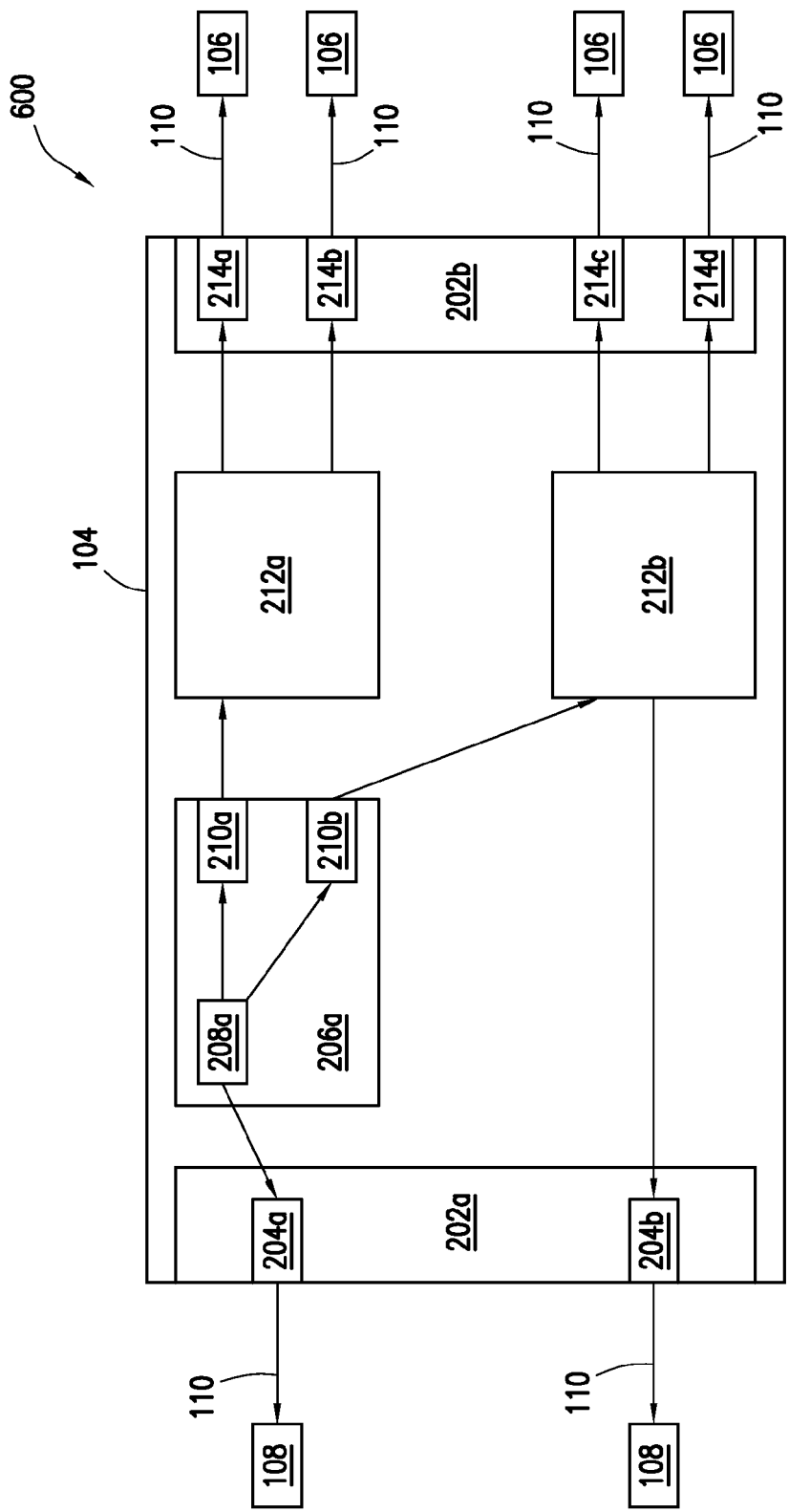
FIG. 6 illustrates a block diagram of an example PEB configured for simultaneous tunneling and peering for the same flood domains of data units provided by a processing instance, in accordance with one embodiment of the present disclosure.

FIG. 6 illustrates a block diagram 600 of an example PEB 104 configured for simultaneous tunneling and peering for the same flood domains 212 of data units provided by processing instance 208a, in accordance with one embodiment of the present disclosure. In PEB 104, processing instance 208 may generate data units if one or more CEPs 204 are configured for peering. The generated data units may be propagated to CEPs 204 that may be communicatively coupled to switching module 206 and processing instance 208. For example, a data unit generated by processing instance 208a may be transmitted or unicast to CEP 204a. Additionally, processing instance may identify flood domains 212 that CEP 204a may be communicatively coupled to by utilizing corresponding PEPs 210. Then, processing instance 208a may flood the generated data units to one or more flood domains 212. For example, processing instance 208a may flood the generated data unit to flood domains 212a and 212b. Thus, the generated data units may be tunneled to CEP 204a to reach the near end customer bridges 108 and may be mapped to flood domains 212a and 212b to be transmitted over PNPs 214 to reach provider bridges 106. The data units generated by processing instance 208a may be untagged as transmitted to CEP 204a and may receive an s-tag as mapped to flood domains 212 and PNPs 214.

With reference to embodiments depicted in FIGS. 4-6, PEB 104 may be configured to tunnel data units until it may be required to peer data units. Such a configuration may have the advantage of lower processing requirements and improved scalability. The embodiments of the present disclosure, may allow customers to forward traffic through multiple flood domains if an application warrants. Further, embodiments of the present disclosure, may take advantage of hardware support of forwarding/flooding data units using multicast addresses wherever possible to minimize processing load.

Figure 7:
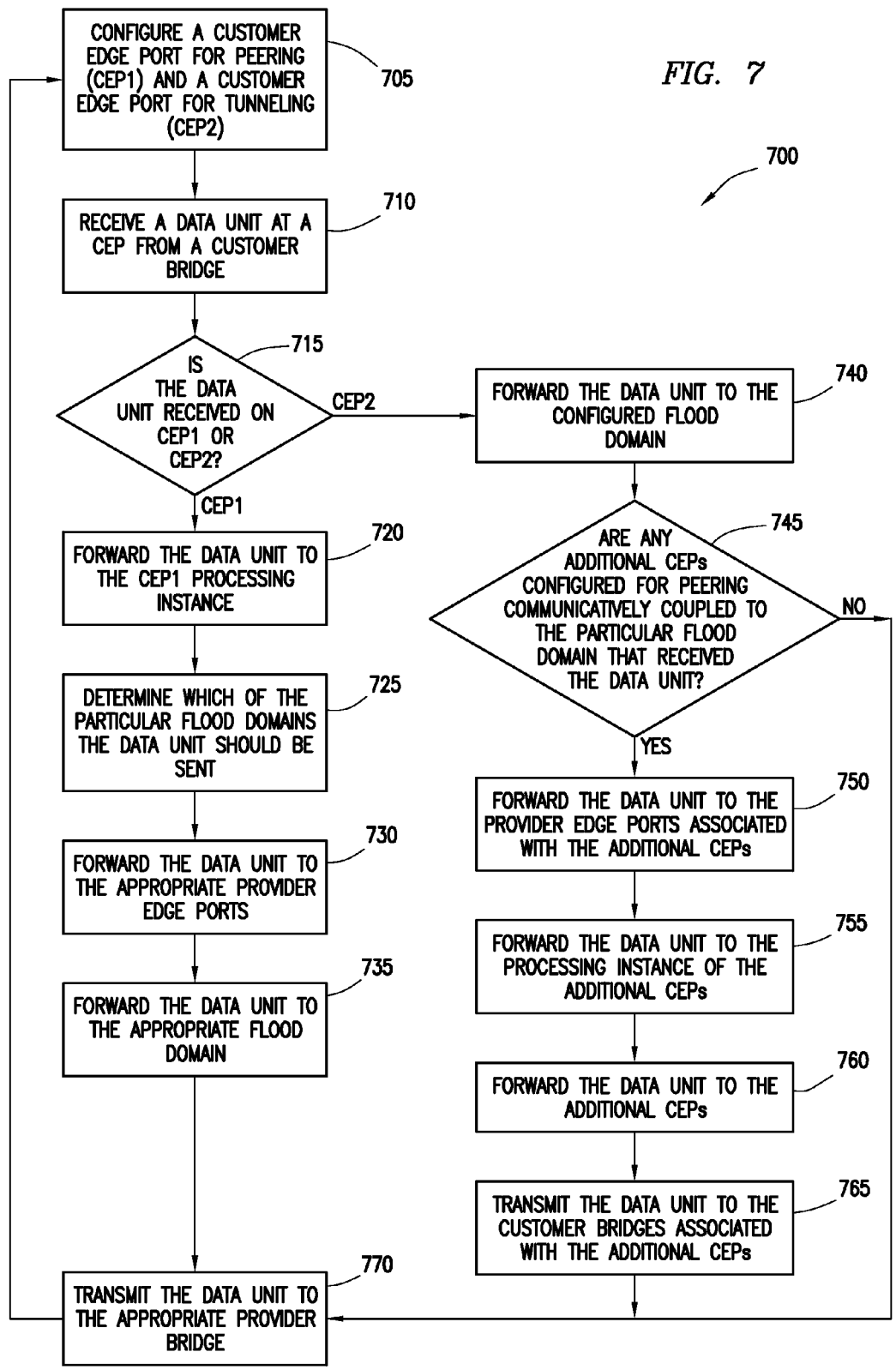
FIG. 7 illustrates a method for support of spanning tree peering and tunneling in the same flood domain operating on a data unit received from a customer bridge, in accordance with one embodiment of the present disclosure.

FIG. 7 illustrates method 700 for support of spanning tree peering and tunneling in the same flood domain operating on a data unit received from a customer bridge, in accordance with one embodiment of the present disclosure. Method 700 may be implemented fully or in part by PEB 104 of FIGS. 2-6. The steps of method 700 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 700 is described with respect to network 100 of FIG. 1 and PEB 104 of FIG. 4; however, method 700 may be used for spanning tree peering and tunneling on any suitable network.

Method 700 may be performed in association with a network element, such as PEB 104 of FIGS. 2-6. Method 700 may be repeated or performed in parallel for each one of the network elements and/or PEBs 104 illustrated in FIG. 1. In addition, although FIG. 7 discloses a certain order of steps to be taken with respect to method 700, the steps comprising method 700 may be completed in any suitable order.

At step 705, a network element, such as PEB 104, may configure a CEP for peering (CEP1) and a CEP for tunneling (CEP2). For example, with reference to FIG. 4, PEB 104 may configure CEP 204a for peering such that CEP 204a is associated with two or more flood domains. PEB 104 may configure CEP 204b for tunneling such that CEP 204b may be associated with only one flood domain.

At step 710, a network element may receive a data unit from a customer bridge. For example, PEB 104 may receive a data unit at CEP 204a or CEP 204b. Method 700 may proceed to step 715.

At step 715, the network element may determine if the data unit is received on CEP1, e.g., the data unit is to be peered, or CEP2, e.g., the data unit is to be tunneled. If the data unit is received on CEP1, method 700 may proceed to step 720. If the data unit is received on CEP2, method 700 may proceed to step 740.

At step 720, the network element may transmit the data unit to the CEP1 processing instance for processing. For example, with reference to FIG. 4, a data unit received at CEP 204a may be transmitted to processing instance 208a for processing. Method 700 may proceed to step 725.

At step 725, the network element may determine which of the particular flood domains that the data unit should be sent. For example, processing instance 208a (e.g., spanning tree protocol (xSTP) instance) may determine that the data unit received at CEP 204a should be forwarded to flood domains 212a and 212b. Method 700 may proceed to step 730.

At step 730, the network element may forward the data unit to a provider edge port to be transmitted to the appropriate flood domains. For example, processing instance 208a may forward the data unit received at CEP 204a to PEPs 210a and 210b.

At step 735, the network element may forward the data unit to the appropriate flood domains. For example, with reference to FIG. 4, PEB 104, utilizing processing instance 208a, may forward the data unit transmitted at CEP 204a to flood domains 212a and 212b, e.g. transmit the data unit to PNPs 214a, 214b, 214c, and 214d. Method 700 may proceed to step 770.

If, at step 715, the data unit is received at CEP2, e.g., the data unit is to be tunneled, method 700 may proceed to step 740. At step 740, PEB 104 may forward a data unit transmitted at CEP 204b directly to flood domain 212b and PNPs 214c and 214d. Method 700 may proceed to step 745.

At step 745, the network element may determine if any additional CEPs configured for peering are communicatively coupled to the particular flood domains that received the tunneled data unit. For example, with reference to FIG. 4, PEB 104 may determine that CEP 204a is communicatively coupled to flood domain 212b, which received the tunneled data unit, and that CEP 204a is configured for peering. If there are additional CEPs configured for peering and communicatively coupled to the flood domain, method 700 may proceed to step 750. If there are no additional CEPs configured for peering and communicatively coupled to the flood domain, method 700 may proceed to step 770.

At step 750, the network element may forward the data unit to the provider edge ports associated with the additional CEPs configured for peering that are communicatively coupled to the to the particular flood domains that received the tunneled data unit. For example, PEB 104 may forward the data unit tunneled from CEP 204b to PEP 210b associated with CEP 204a that is configured for peering. Method 700 may proceed to step 755.

At step 755, the network element may forward the data unit to the processing instance associated with the additional CEPs configured for peering that are communicatively coupled to the to the particular flood domains that received the tunneled data unit. As example, with reference to FIG. 4, the data unit received at PEP 210b may be forwarded to processing instance 208a associated with CEP 204a. Method 700 may proceed to step 760.

At step 760, the network element may forward the data unit to the additional CEPs configured for peering that are communicatively coupled to the particular flood domains that received the tunneled data unit. For example, the data unit processed at 208a that was received at PEP 210b may be forwarded to CEP 204a. Method 700 may proceed to step 765.

At step 765, the network element may transmit the data unit to the customer bridges associated with the additional CEPs configured for peering that are communicatively coupled to the to the particular flood domains that received the tunneled data unit. As example, with reference to FIG. 4, the data unit may be transmitted to customer bridge 108 associated with CEP 204a. Method 700 may proceed to step 770.

At step 770, the network element may transmit the data unit to the appropriate provider bridge. For example, with reference to FIG. 4, PEB 104 may transmit the data unit received on CEP 204b to PNPs 214c and 214d for further transmission to associated provider bridge 106. PEB 104 may transmit the data unit received on CEP 204b to provider bridges 106 associated with PNPs 214a, 214b, 214c, and 214d. Method 700 may return to step 705.

Figures 8, 9:
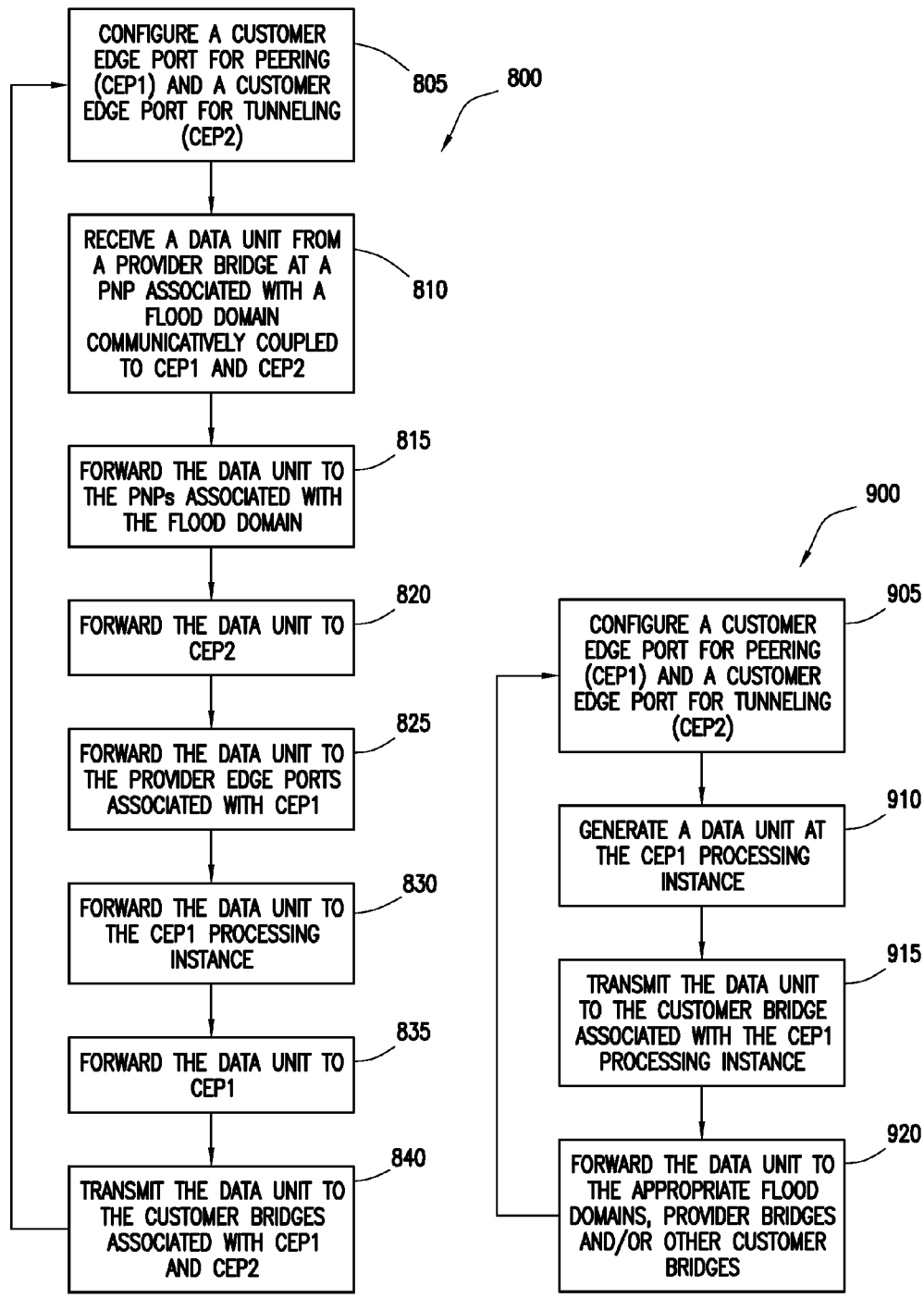
FIG. 8 illustrates a method for support of spanning tree peering and tunneling in the same flood domain operating on a data unit received from a provider bridge, in accordance with one embodiment of the present disclosure.
FIG. 9 illustrates a method for support of spanning tree peering and tunneling in the same flood domain operating on a data unit generated at a processing instance, in accordance with one embodiment of the present disclosure.

FIG. 8 illustrates method 800 for support of spanning tree peering and tunneling in the same flood domain operating on a data unit received from a provider bridge, in accordance with one embodiment of the present disclosure. Method 800 may be implemented fully or in part by PEB 104 of FIGS. 2-6. The steps of method 800 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media.

For illustrative purposes, method 800 is described with respect to network 100 of FIG. 1 and PEB 104 of FIG. 5; however, method 800 may be used for spanning tree peering and tunneling on any suitable network.

Method 800 may be performed in association with a network element, such as PEB 104 of FIGS. 2-6. Method 800 may be repeated or performed in parallel for each one of the network elements and/or PEBs 104 illustrated in FIG. 1. In addition, although FIG. 8 discloses a certain order of steps to be taken with respect to method 800, the steps comprising method 800 may be completed in any suitable order.

At step 805, a network element, such as PEB 104, may configure a CEP for peering (CEP1) and a CEP for tunneling (CEP2). For example, with reference to FIG. 5, PEB 104 may configure CEP 204a for peering such that CEP 204a is associated with two or more flood domains. PEB 104 may configure CEP 204b for tunneling such that CEP 204b may be associated with only one flood domain.

At step 810, a network element may receive a data unit from a provider bridge at a provider network port associated with a flood domain that may be communicatively coupled to CEP1 and CEP2. For example, PEB 104 may receive a data unit at PNP 214c that is associated with flood domain 212b. Flood domain 212b may be communicatively coupled to CEPs 204a and 204b. Method 800 may proceed to step 815.

At step 815, the network element may forward the data unit to other provider network ports associated with the flood domain. For example, with reference to FIG. 5, PEB 104 may forward the data unit received at PNP 214c to PNP 214d that is associated with flood domain 212b. Method 800 may proceed to step 820.

At step 820, the network element may forward the data unit to CEP2, which may be configured for tunneling and communicatively coupled to the flood domain. For example, PEB 104 may forward the data unit from flood domain 212b to CEP 204b. Method 800 may proceed to step 825.

At step 825, the network element may forward the data unit to the provider edge ports associated with CEP1 configured for peering that are communicatively coupled to the particular flood domain that received the data unit. For example, PEB 104 may forward the data unit received at PNP 214c to PEP 210b associated with CEP 204a that is configured for peering. Method 800 may proceed to step 830.

At step 830, the network element may forward the data unit to the processing instance associated with CEP1 configured for peering that is communicatively coupled to the to the particular flood domains that received the data unit. As example, with reference to FIG. 5, the data unit received at PEP 210b may be forwarded to processing instance 208a associated with CEP 204a. Method 800 may proceed to step 835.

At step 835, the network element may forward the data unit to CEP1 configured for peering that is communicatively coupled to the to the particular flood domains that received the data unit. For example, the data unit processed at 208a that was received at PEP 210b may be forwarded to CEP 204a. Method 800 may proceed to step 840.

At step 840, the network element may transmit the data unit to the customer bridges associated with CEP1 and CEP2. As example, with reference to FIG. 5, the data unit may be transmitted to customer bridges 108 associated with CEPs 204a and 204b. Method 800 may return to step 805.

FIG. 9 illustrates method 900 for support of spanning tree peering and tunneling in the same flood domain operating on a data unit generated at a processing instance, in accordance with one embodiment of the present disclosure. Method 900 may be implemented fully or in part by PEB 104 of FIGS. 2-6.

The steps of method 900 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 900 is described with respect to network 100 of FIG. 1 and PEB 104 of FIG. 6; however, method 900 may be used for spanning tree peering and tunneling on any suitable network.

Method 900 may be performed in association with a network element, such as PEB 104 of FIGS. 2-6. Method 900 may be repeated or performed in parallel for each one of the network elements and/or PEBs 104 illustrated in FIG. 1. In addition, although FIG. 9 discloses a certain order of steps to be taken with respect to method 900, the steps comprising method 900 may be completed in any suitable order.

At step 905, a network element, such as PEB 104, may configure a CEP for peering (CEP1) and a CEP for tunneling (CEP2). For example, with reference to FIG. 6, PEB 104 may configure CEP 204a for peering such that CEP 204a is associated with two or more flood domains. PEB 104 may configure CEP 204b for tunneling such that CEP 204b may be associated with only one flood domain.

At step 910, a network element may generate a data unit at a processing instance. For example, PEB 104 may generate a data unit at processing instance 208a. Method 900 may proceed to step 915.

At step 915, the network element may transmit the data unit to the customer bridge associated with the CEP processing instance. For example, PEB 104 may transmit the data unit generated by processing instance 208a to CEP 204a for further transmission to customer bridge 108 communicatively coupled to CEP 204a. Method 900 may proceed to step 920.

At step 920, the network element may forward the data unit to the appropriate flood domains, provider bridges, and/or other customer bridges. For example, with reference to FIG. 6, PEB 104 may forward a data unit generated by processing instance 208a to flood domains 212a and 212b, provider bridges 106 communicatively coupled to PNPs 214a, 214b, 214c, and PNP 214d, and/or to customer bridge 108 communicatively coupled to CEP 204b. Method 900 may return to step 905.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A network element comprising:
   a first customer edge port (CEP) communicatively coupled to a customer network, a first flood domain, and a second flood domain, the first flood domain and the second flood domain each comprising one or more provider network ports associated with a provider network, the first CEP configured to peer spanning tree protocol (STP) data units across the provider network and further configured to:
   receive a first data unit; and
   transmit the first data unit to a first STP processing instance associated with the first CEP;
   the first STP processing instance configured to:
      determine whether the first data unit is associated with the first flood domain or the second flood domain; and
      forward the first data unit to the determined flood domain;
   a second CEP communicatively coupled to the customer network and the first flood domain, the second CEP configured to tunnel STP data units across the provider network and further configured to:
   receive a second data unit; and
   forward the second data unit to the first flood domain.

2. The network element of claim 1, further comprising a third CEP communicatively coupled to the customer network, the first flood domain, and the second flood domain, the third CEP configured to peer STP data units across the provider network and further configured to transmit the second data unit to a second STP processing instance associated with the third CEP.

3. The network element of claim 1, further comprising:
   a first provider network port of the first flood domain and coupled to the provider network, the first provider network port configured to:
   receive a third data unit from the provider network; and
   forward the third data unit to a second provider network port of the first flood domain.

4. The network element of claim 3, wherein the first provider network port is further configured to forward the third data unit to the second CEP.

5. The network element of claim 3, wherein the first provider network port is further configured to forward the third data unit to the first STP processing instance.

6. The network element of claim 5, wherein the first STP processing instance forwards the third data unit to the first CEP.

7. The network element of claim 1, wherein determining whether the first data unit is associated with the first flood domain or the second flood domain comprises determining the identity of a flood domain indicated in a tag of the first data unit.

8. The network element of claim 7, wherein the tag is one of a customer virtual local area network (VLAN) tag or a service VLAN tag.

9. The network element of claim 1, wherein the first STP processing instance is further configured to:
   generate a third data unit; and
   forward the third data unit to the first CEP, the first flood domain, and the second flood domain.

10. A method for support of spanning tree peering and tunneling with a plurality of flood domains comprising:
    configuring a first customer edge port (CEP) to peer spanning tree protocol (STP) data units across a provider network, the first CEP communicatively coupled to a customer network, a first flood domain, and a second flood domain, the first flood domain and second flood domain each comprising one or more provider network ports associated with the provider network;
    receiving a first data unit at the first CEP;
    transmitting the first data unit to a first STP processing instance associated with the first CEP;

determining whether the first data unit is associated with the first flood domain or the second flood domain;

forwarding the first data unit to the determined flood domain;

configuring a second CEP to tunnel STP data units across the provider network, the second CEP communicatively coupled to the customer network and the first flood domain;

receiving a second data unit at the second CEP; and forwarding the second data unit to the first flood domain.

11. The method of claim 10, further comprising:

configuring a third CEP to peer STP data units across the provider network, the third CEP communicatively coupled to the customer network, the first flood domain, and the second flood domain; and transmitting the second data unit to a second STP processing instance associated with the third CEP.

12. The method of claim 10, further comprising:

configuring a first provider network port of the first flood domain and coupled to the provider network to receive a third data unit from the provider network; and forwarding the third data unit to a second provider network port of the first flood domain.

13. The method of claim 12, further comprising forwarding the third data unit to the second CEP.

14. The method of claim 12, further comprising forwarding the third data unit to the first STP processing instance.

15. The method of claim 14, further comprising forwarding the third data unit to the first CEP.

16. The method of claim 10, wherein determining whether the first data unit is associated with the first flood domain or the second flood domain comprises determining the identity of a flood domain indicated in a tag of the first data unit.

17. The method of claim 16, wherein the tag is one of a customer virtual local area network (VLAN) tag or a service VLAN tag.

18. The method of claim 10, further comprising:

generating a third data unit at the first STP processing instance; and forwarding the third data unit to the first CEP, the first flood domain, and the second flood domain.

* * * * *